(12) United States Patent
Li

(10) Patent No.: US 6,833,862 B1
(45) Date of Patent: Dec. 21, 2004

(54) IMAGE SENSOR BASED VIGNETTING CORRECTION

(75) Inventor: Wei Li, Cupertino, CA (US)

(73) Assignee: Logitech, Inc., CA (US)

( * ) Notice: Subject to any disclaimer, the term of this patent is extended or adjusted under 35 U.S.C. 154(b) by 0 days.

(21) Appl. No.: 09/345,167

(22) Filed: Jun. 30, 1999

(51) Int. Cl.[7] .................. H04N 5/225; H04N 5/217; H04N 1/40
(52) U.S. Cl. .............. 348/207.99; 348/241; 358/461
(58) Field of Search .................. 348/241, 251, 348/207.99, 335; 358/461; 378/98.7

(56) References Cited

U.S. PATENT DOCUMENTS

| | | | |
|---|---|---|---|
| 4,816,663 A | | 3/1989 | Utagawa et al. ............. 250/201 |
| 4,884,140 A | | 11/1989 | Park ........................ 358/168 |
| 4,979,042 A | * | 12/1990 | Vogel ....................... 348/251 |
| 5,047,861 A | * | 9/1991 | Houchin et al. ............ 348/247 |
| 5,343,302 A | * | 8/1994 | Yamashita .................. 348/251 |
| 5,381,174 A | | 1/1995 | de Groot et al. ............ 348/207 |
| 5,434,902 A | | 7/1995 | Bruijns ..................... 378/98.7 |
| 5,563,405 A | * | 10/1996 | Woolaway et al. ......... 250/208.1 |
| 5,576,797 A | | 11/1996 | Kusaka et al. .............. 396/121 |
| 5,784,100 A | * | 7/1998 | Konishi ..................... 348/251 |
| 5,917,549 A | * | 6/1999 | Simons et al. ............. 348/441 |
| 6,055,066 A | * | 4/2000 | Kanda ....................... 358/461 |
| 6,195,469 B1 | * | 2/2001 | Nishioka et al. ........... 382/274 |
| 6,538,691 B1 | * | 3/2003 | Macy et al. ............... 348/222.1 |

OTHER PUBLICATIONS

"Machine Vision Technique for increasing the integrity of chip alignment data" IBM Technical Disclosure Bulletin, Mar. 1992, vol. 34, issue 10b, pp. 129–131.*

* cited by examiner

*Primary Examiner*—Andrew Christensen
*Assistant Examiner*—Nhan Tran
(74) *Attorney, Agent, or Firm*—Townsend and Townsend and Crew LLP

(57) ABSTRACT

A method and apparatus for constructing an inexpensive camera with vignetting correction in the camera electronic hardware. The hardware is programmable through the use of a register storing a constant value corresponding to the amount of vignetting of a particular lens used in the camera. The register value is provided to a correction circuit which implements an algorithm that corrects for the amount of vignetting of pixels depending upon the pixel position.

15 Claims, 3 Drawing Sheets

IMAGE SENSOR BASED VIGNETTING CORRECTION

BACKGROUND OF THE INVENTION

The present invention relates to digital cameras, and in particular to correcting vignetting effects.

The vignetting effect is when the brightness around the edges of a screen is less than the brightness in the center of the screen, creating a halo effect. Professional photographers will sometimes try to intentionally create this effect with an appropriate lens or screen, to produce a softened image at the edges of a picture. However, when this effect appears unintentionally in digital photographs, it is annoying. A variety of techniques have been developed to measure and address vignetting effects.

U.S. Pat. No. 4,884,140 shows an analog circuit for providing vignetting compensation for a video camera using a zoom lens which causes vignetting.

U.S. Pat. No. 5,434,902 shows measuring the vignetting effect for an x-ray examination apparatus by using a constant brightness image. A correction factor is then stored in the memory for each pixel.

U.S. Pat. No. 5,576,797 shows the detection of vignetting effects in a camera with a focus detecting device.

U.S. Pat. No. 5,381,174 shows the correcting of vignetting due to operation of a zoom lens by using a field frequency sawtooth signal.

U.S. Pat. No. 4,816,663 shows the detection of vignetting between a photo taking lens and focus detecting optical system.

Digital cameras for use with a personal computer for personal teleconferencing have become cheaper and cheaper. This puts pressure on the camera manufacturers to use cheaper lenses, which have more of a vignetting effect. In addition, the price pressure forces manufacturers to use fewer semiconductor chips, thus making the use of semiconductor memory to store vignetting corrections undesirable. Accordingly, there is a need for a digital camera which is inexpensive to manufacture and also corrects for vignetting of an inexpensive lens.

SUMMARY OF THE INVENTION

The present invention provides a method and apparatus for constructing an inexpensive camera with vignetting correction in the camera electronic hardware. The hardware is programmable through the use of a register storing a constant value corresponding to the amount vignetting of a particular lens used in the camera. The register value is provided to a hardware correction circuit which implements an algorithm which corrects for the amount of vignetting of pixels depending upon the pixel position.

The invention thus allows different lens suppliers or lens types to be used in cameras as they are manufactured, by simply programming a different computed value into the register. The correction is applied on the raw sensor data after it is converted into digital form, near the sensor itself. Thus, the data is corrected prior to the optional collection of statistics on the sensor data and the compression of the data for transmission to a host computer over a bus. The vignetting correction of the invention maintains the resolution of the image and allows real-time performance. It also makes more accurate statistics collection, thus making the automatic gain control (AGC) in the host, and the automatic white balance (AWB) in the host more accurate.

For a further understanding of the nature and advantages of the invention, reference should be made to the following description taken in conjunction with the accompanying drawings.

DESCRIPTION OF THE SPECIFIC EMBODIMENTS

Figure 1:
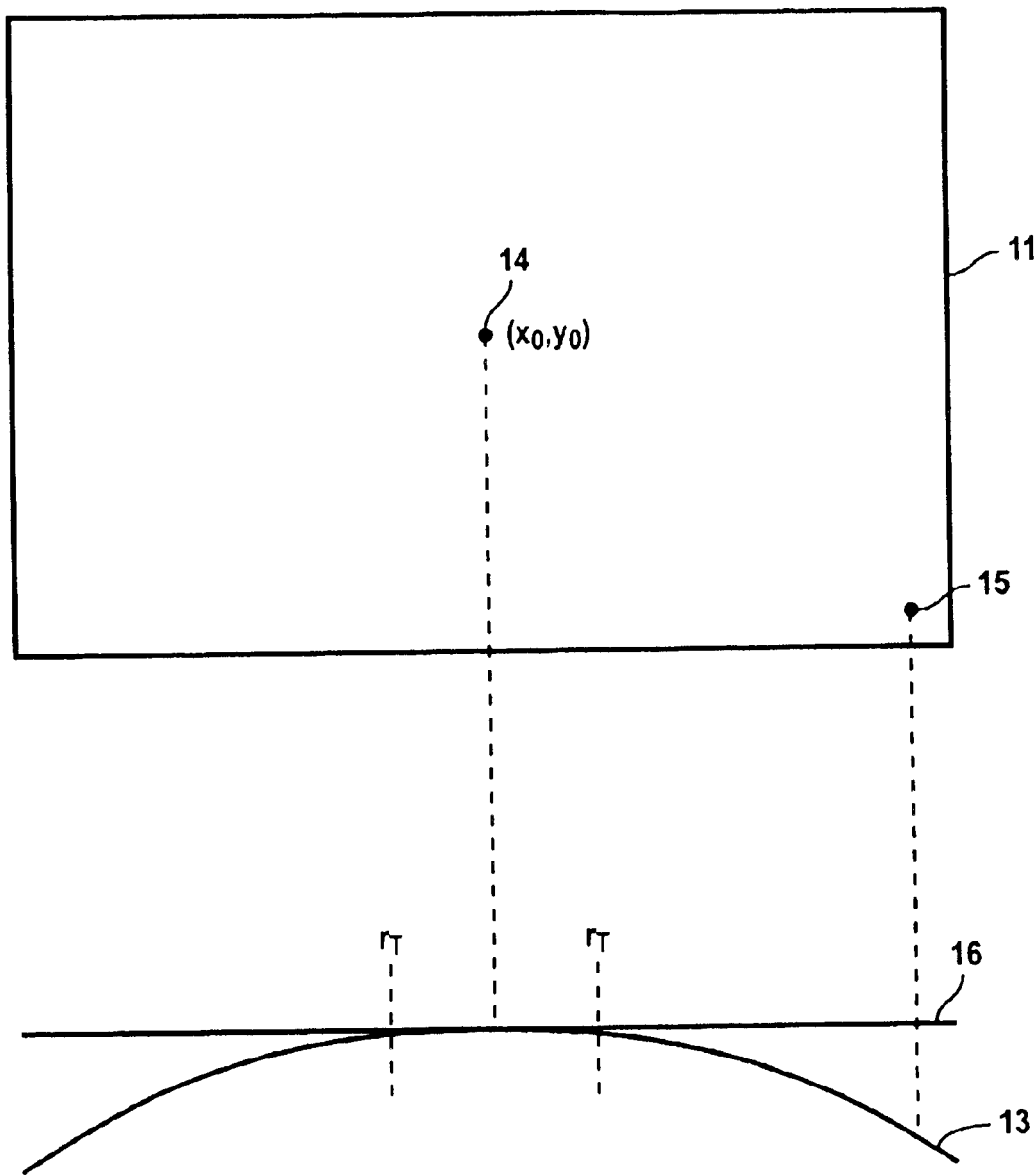
FIG. 1 is a drawing of a pixel array and brightness curve illustrating the vignetting effect.

FIG. 1 illustrates a pixel array 11 and a corresponding brightness curve 13 over the Y axis. A central pixel 14 with value $(x_0, y_0)$ corresponds to the point of maximum brightness of the lens. A second example pixel 15 is near the minimum brightness, showing a vignetting effect of having the difference between curve 13 and a maximum brightness value 16. The present invention corrects this vignetting effect in both X and Y directions.

In one embodiment, a threshold indicated by $r_T$ is illustrated within which the curve 13 is near the maximum value 16, and no vignetting correction need be applied. Alternately, the correction can be applied to all of the pixels regardless to avoid any transition effects at the points $r_T$.

Figure 2:
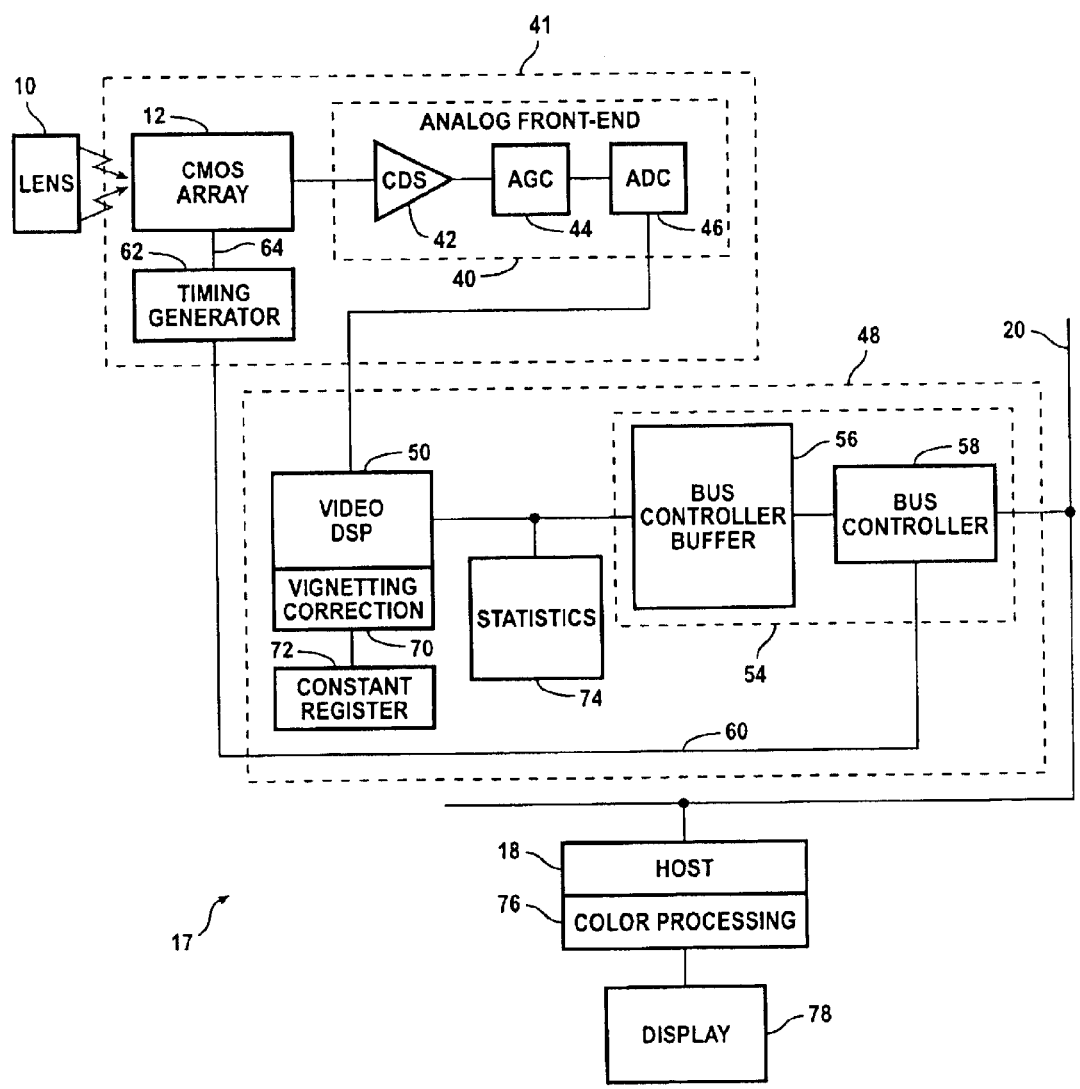
FIG. 2 is a block diagram of a camera and computer system with vignetting correction according to one embodiment of the invention.

FIG. 2 illustrates a camera and computer system implementing the vignetting correction of the invention. Shown is a video camera 17 and host computer 18. Video camera 17 includes a lens 10 and a photo sensor array, such as a CMOS or CCD array 12, and is connected to a USB (Universal Serial Bus) 20.

The signals from the CMOS chip are provided to an analog front end 40 which includes a differential amplifier or correlated double sampler (CDS) 42, which provides the analog signals to an automatic gain control (AGC) circuit 44. The data is then provided to an analog-to-digital converter (ADC) 46.

The digitized signals, rather than being stored in a frame buffer memory as in the prior art, are then provided directly to a digital processing circuit 48. They are first provided to a video digital signal processor 50 which performs the compression, cropping, scaling and other functions on the data, as well as digital filtering.

Data from video DSP 50 is provided to a bus interface 54 which includes a bus controller buffer 56 and a bus controller 58. Preferably, bus controller buffer 56 is capable of storing two USB frames at the maximum possible rate, or 2 Kbytes. Depending upon the frame rate, compression rate, etc., this may typically vary up to 10 lines, or even to 15–20 lines if decimation is done.

Bus controller 58 provides a control signal on a line 60 to a timing generator 62. Timing generator 62 provides clocking signals on line 64 to CMOS chip 12. Clocking signals 64 include the horizontal and vertical transfer pulses. In one embodiment, the analog front end 40 and the timing generator 62 are integrated onto the same semiconductor chip substrate 41 as CMOS array 12.

DSP unit 50 includes a vignetting correction circuit 70 according to the present invention. This circuit utilizes a constant value in a constant register 72 to perform the vignetting correction. Depending upon the particular lens 10 which is chosen, its specified vignetting amount can be used to provide constant 72. Thus, different lenses could be used in manufacturing a camera by simply programming a different constant value into register 72. This allows multiple sources to be used for the lenses, and allows compensation for changes in lens quality from lot to lot or manufacturer to manufacturer.

As can be seen, the vignetting correction is done before a statistics unit 74 collects statistics which are then transmitted to the host processor 18. In addition, it is prior to any compression performed in bus interface 54.

On the host side of bus 20, host 18 includes a color processing unit 76 which can perform AGC and AWB (automatic white balance) adjustments based on the statistics provided it. Since the vignetting correction is applied before the statistics are taken, this processing will be more accurate. In addition, the application of the vignetting correction prior to compression and transmission over the bus also improves the accuracy of the signal. After color processing, the signal is provided to a display 78 as shown.

An embodiment of an equation for implementation and hardware to perform the vignetting correction is set forth below. The vignetting defect of a low quality lens may be modeled as pass through in the middle of the lens and a parabolic curve near the edge of the lens. The transform function is isotropic. Let $p_i$ and $p_o$ be the pixel value before and after vignetting correction, and $x_0$ and $y_0$ be the coordinate of the center of the lens (should be the center of the image if the lens is mounted properly). Then, $$p_o = p_i * (a * r^2 + 1)$$
$$= p_i * (a * ((x - x_0)^2 + (y - y_0)^2) + 1$$

"a" is a small positive constant. To be on the safe side, a maximum of 50% vignetting can be corrected, which means:

1.0=0.5*(a*(176*176+144*144)+1)

a=1.9338*10$^{-5}$

Normalized by $2^{26}$, this will give a=1298. By limiting a to 0 through 1023, and performing the inverse computation, the maximum correctable vignetting is 56%.

Note that in the formula given above, the pixel aspect ratio is not taken into account. For square pixel, the equation is exact, for 12/11 pixel aspect ratio, the result is slightly off. Also, a will be scaled by ¼ if the sensor format is non-scaled QCIF (subsampled QCIF from CIF by leaving out every other pixels in both horizontal and vertical directions).

If $y_i$ is 10 bits, $(x-x_0)^2$ and $(y-y_0)^2$ are each 16 bits (for CIF size), and $y_0$ is 10 bits, this determines that a needs to be 10 by bits (0 through 1023).

Figure 3:
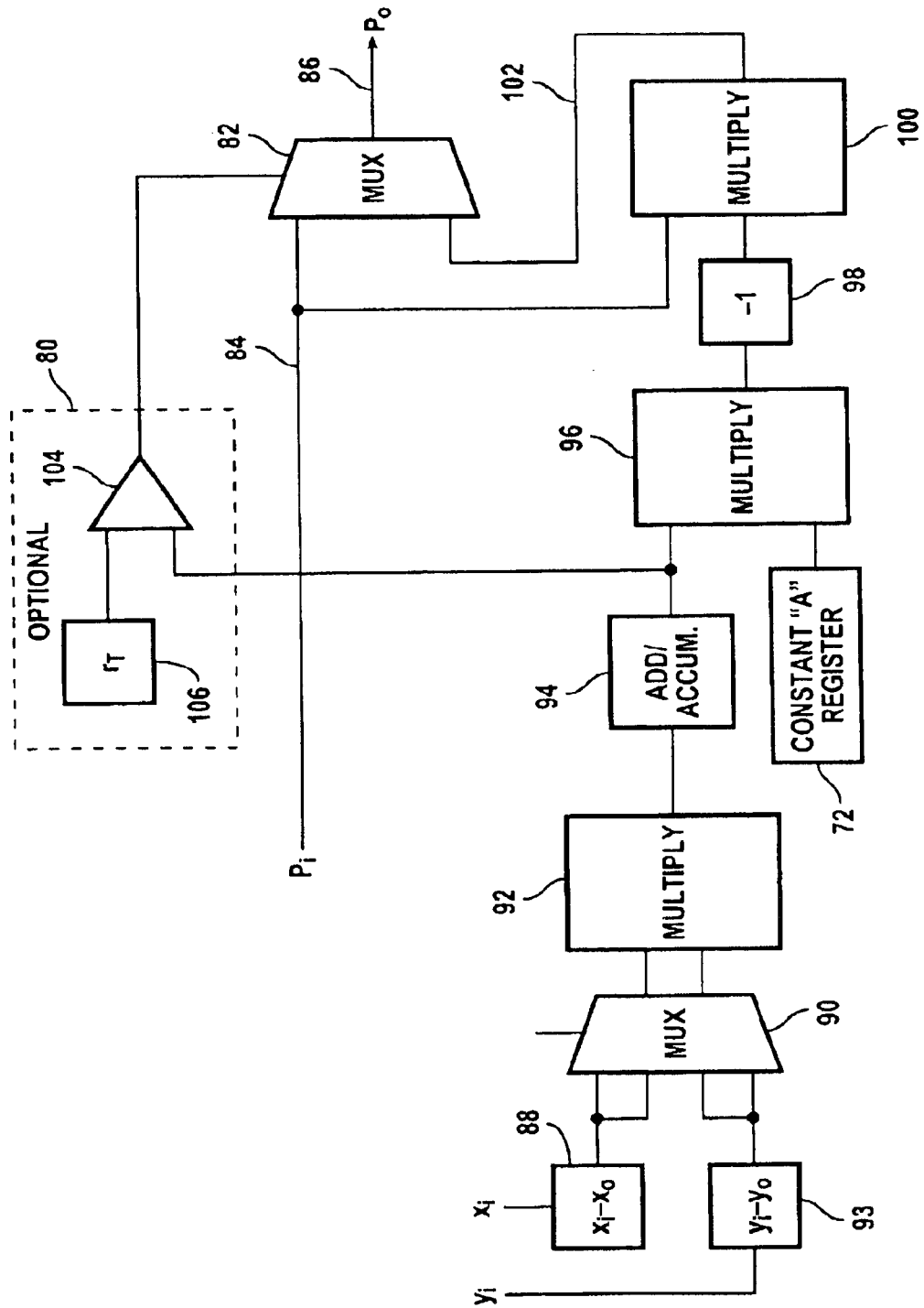
FIG. 3 is a block diagram of one embodiment of a hardware vignetting correction circuit according to the invention.

FIG. 3 is a block diagram of one embodiment of a hardware system for implementing the equation described above. In particular, an optional selection circuit 80 is applied to the select input of a multiplexer 82. Where the pixel position is less than the threshold $r_2$, the input pixel $p_i$ on line 84 is simply passed through to the output pixel, $p_o$, on line 86. If it is greater than the threshold, a vignetting correction is applied by implementing the formula above with the hardware shown in FIG. 3.

In particular, the current x value of the pixel, $x_i$, is applied to arithmetic circuit 88, where the central pixel, $x_0$, is subtracted from it. This value is then squared by applying its input twice, through a multiplexer 90, to a multiply circuit 92, where it is accumulated in an add/accumulator 94. Similarly, the y value $y_i$ is provided to a circuit 96, where the difference from the center y value, $y_0$, is determined. This is similarly applied as two values through mux 90 to a multiplier 92, where it is squared and provided to add/accumulator 94, where it is added to the squared x value. The use of the multiplexer simply allows, by time division multiplexing, the same multiplier 92 to be used for both calculations. Obviously, an alternative would be to provide two separate multiply units.

The output of accumulator 94 is then provided to a second multiplier 96, where it is multiplied by the constant value from register 72. The value of one is then subtracted in a unit 98, and this value is multiplied by the pixel value, $p_i$, in a multiplier 100. The output is provided on a line 102 through multiplexer 82 to output line 86. Obviously, variations of the circuitry could be provided, such as using the same multiply circuit for multipliers 92, 96 and 100, with the multiplier being used for different purposes in different time slots.

Optional circuit 80 provides a comparator 104 which compares the output of add/accumulator 94 (the radius value of the $x^2+y_2$ values) to the threshold radius in a register 106.

Preferably, the constant a has the same number of bits as the pixel value, $p_i$. Thus, if $p_i$ is 10 bits, while the x and y values are 16 bits, the constant a would be 10 bits. Also, a can be scaled by ¼ if the sensor format is non-scaled QCIF (cropped). Thus, correction is provided where the image is cropped before the vignetting correction.

In addition, correction can be done for the pixel aspect ratio by multiplying the y value by 11/12 where a TV will be used.

In one embodiment, the correction will take place only outside a predefined diameter. This assumes that the lens performs satisfactorily around the center of the lens, which is often a reasonable assumption. By doing so, a more accurate correction model can be derived. Let $r_T$ be the diameter within which the vignetting defect can be ignored. Then, If $r <= r_T$, $$p_o = p_i,$$

if $r >= r_T$, $$p_o = p_i * (a*(r^2 - r_T^2) + 1)$$
$$= p_i * (a*(((x-x_0)^2 + (y-y_0)^2) - ((x_T-x_0)^2 + (y_T-y_0)^2)) + 1)$$

The present invention thus allows variation in lenses and also cheaper lenses to be used. It improves the AGC and AWB in the host computer. Additionally, it allows better object motion tracking. Object motion is usually done by assuming the luminance value is the same as the object moves to the edge of a sensor, and thus tracking by looking for the same luminance value. Obviously, vignetting effects can thwart the efforts to locate the object. By applying the vignetting correction close to the sensor, this can be overcome. The invention also provides overall improved video quality.

Also, due to the need for image compression for transmitting over a bus, such as a universal serial bus (USB), having the host do vignetting corrections will result in less precision. Providing vignetting correction on the sensor side of the bus in the present invention provides the correction prior to compression to transmit over the bus.

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A method for manufacturing a camera which connects to a computer, comprising:
   determining a vignetting effect of a first lens;
   installing said first lens in a first camera housing;
   determining a vignetting effect of a second lens;
   installing said second lens in a second camera housing;
   installing in each housing a photosensor array mounted behind said lens;
   coupling an analog processing circuit to each said photosensor array;
   coupling an analog to digital converter to each said analog processing circuit;
   coupling a digital processing circuit to an output of each said analog to digital converter, said digital processing circuit including
      a register for storing a single vignetting constant corresponding to a vignetting rating of said lens, and
      a correction circuit, coupled to said register, for adjusting a value of selected pixels according to a formula using said single vignetting constant and a set of pixel coordinates to scale the single vignetting constant based on a distance of the selected pixels from an approximately central pixel, to correct for vignetting of said lens;
   coupling a bus interface circuit to an output of each said digital processing circuit for connecting to a bus for transfer of data to said computer;
   storing a first vignetting constant in said register in said first camera housing, said first vignetting constant corresponding to said vignetting effect of said first lens;
   storing a second vignetting constant in said register in said second camera housing, said second vignetting constant corresponding to said vignetting effect of said second lens.

2. The method of claim 1 wherein said correction circuit does not adjust the value of pixels within a selected distance of a center of said lens.

3. The method of claim 1 wherein said correction circuit also corrects for a pixel aspect ratio.

4. The method of claim 1 wherein said vignetting constant has a number of bits equal to a number of bits used to represent a brightness of said selected pixels.

5. The method of claim 1 wherein said correction circuit further comprises a scaling input for scaling said vignetting constant.

6. The method of claim 1, wherein said correction circuit does not adjust the value of pixels within a threshold distance from a center of said lens.

7. The method of claim 1, wherein the correction circuit does not multiply values of pixel by the single vignetting constant within a threshold distance from a center of said lens.

8. The method of claim 1, wherein the correction circuit does not apply the formula to values of pixels within a select distance of a center of said lens.

9. A camera for connecting to a computer, comprising:
   a lens;
   a photosensor array mounted behind said lens;
   an analog processing circuit coupled to said photosensor array;
   an analog to digital converter coupled to said analog processing circuit;
   a digital processing circuit coupled to an output of said analog to digital converter, said digital processing circuit including
      a register for storing a single vignetting constant corresponding to a vignetting rating of said lens, and
      a correction circuit, coupled to said register, for adjusting a value of selected pixels according to a formula using said single vignetting constant and a set of pixel coordinates to scale the single vignetting constant based on a distance of the selected pixels from an approximately central pixel, to correct for vignetting of said lens; and
   a bus interface circuit coupled to an output of said digital processing circuit for connecting to a bus for transfer of data to said computer.

10. The camera of claim 9 wherein said correction circuit does not adjust the value of pixels within a selected distance of a center of said lens.

11. The camera of claim 9 wherein said correction circuit also corrects for a pixel aspect ratio.

12. The camera of claim 9 wherein said single vignetting constant has a number of bits equal to a number of bits used to represent a brightness of said selected pixels.

13. The camera of claim 9 further comprising a scaling input to said correction circuit, for scaling said signal vignetting constant.

14. The camera of claim 9, further comprising a selection circuit configured to pass values of pixels that are within a select distance from the center of said lens to the bus interface circuit, wherein the values of the pixel that are within the select distance are not adjusted by the correction circuit.

15. The camera of claim 9, further comprising a selection circuit configured to pass values of pixels that are within a select distance from the center of said lens to the bus interface circuit, wherein the values of the pixel that are within the select distance are not multiplied by the single vignetting constant.

* * * * *

UNITED STATES PATENT AND TRADEMARK OFFICE
CERTIFICATE OF CORRECTION

PATENT NO. : 6,833,862 B1
DATED : December 21, 2004
INVENTOR(S) : Li, Wei

It is certified that error appears in the above-identified patent and that said Letters Patent is hereby corrected as shown below:

Column 3,
Line 62, should read -- In particular, the current x value of the pixel, xi, is applied to arithmetic circuit 88, where the central pixel, x0, is subtracted from it. This value is then squared by applying its input twice, through a multiplexer 90, to a multiply circuit 92, where it is accumulated in an add/accumulator 94. Similarly, the y value yi is provided to a circuit 93, where the difference from the center y value, y0, is determined. This is similarly applied as two values through mux 90 to a multiplier 92, where it is squared and provided to add/accumulator 94, where it is added to the squared x value. The use of the multiplexer simply allows, by time division multiplexing, the same multiplier 92 to be used for both calculations. Obviously, an alternative would be to provide two separate multiply units. --.

Column 5,
Line 50, should read -- 7. The method of claim 1, wherein the correction circuit passes values of pixels to the bus interface circuit that are within a threshold distance from a centers of said lenses, and does not multiply these values of pixels passed to the bus interface circuit by the single vignetting constant. --.

Column 6,
Line 1, should read -- 8. The method of claim 1, wherein the correction circuit passes values of pixels to the bus interface circuit that are within a threshold distance from a centers of said lenses, and does not apply the formula to these values of pixels passed to the bus interface circuit. --.

Signed and Sealed this

Twentieth Day of September, 2005

JON W. DUDAS
*Director of the United States Patent and Trademark Office*